United States Patent [19]

Lannan et al.

[11] Patent Number: 5,327,669
[45] Date of Patent: Jul. 12, 1994

[54] ROD ORGANIZER

[76] Inventors: Edie Lannan, 2620 Polk St. NE., Minneapolis, Minn. 55418; David Teigen, 2746 Upland Ct., Plymouth, Minn. 55447

[21] Appl. No.: 62,808

[22] Filed: May 11, 1993

[51] Int. Cl.[5] ............................................. A01K 97/08
[52] U.S. Cl. ................................... 43/26; 206/315.11
[58] Field of Search ....................... 43/26; 206/315.11; 224/922; 190/901; 383/4, 38, 39, 88, 89

[56] References Cited

U.S. PATENT DOCUMENTS

| | | | |
|---|---|---|---|
| 2,854,775 | 10/1958 | Kleckley | 43/26 |
| 3,575,327 | 4/1971 | Harrison | 43/26 |
| 3,972,144 | 8/1976 | Geisler | 43/26 |
| 4,417,612 | 11/1983 | Couture | 383/39 |
| 4,423,834 | 1/1984 | Rush | 190/901 |
| 4,726,141 | 2/1988 | McBride | 43/26 |
| 4,881,684 | 11/1989 | Chinman | 190/901 |
| 4,901,899 | 2/1990 | Barrett | 206/315.11 |
| 5,002,401 | 3/1991 | Blackman | 383/39 |

Primary Examiner—Kurt C. Rowan
Attorney, Agent, or Firm—Palmatier, Sjoquist & Helget

[57] ABSTRACT

A carrying and storage case for fishing rods with attached reels and accessories is disclosed. The case is comprised of a durable fabric substantially rectangular in shape, the case has a plurality of adjacent elongate pockets which extend from one end of the case to the other end with the opening for each sequential pocket located on alternating ends of the case. The pockets are widest at the opening and narrow towards the opposite end of the pocket. The pocket and openings are sized to permit insertion of a fishing rod with attached reel into the pocket. Flaps on each end of the case fold over the openings of the pockets. The case has a plurality of straps with interlocking fabric extending from the top of the case whereby the case may be rolled up and secured by the straps in the rolled-up position with rods and attached reels in the pockets. The case has a handle and/or shoulder strap for carrying.

20 Claims, 2 Drawing Sheets

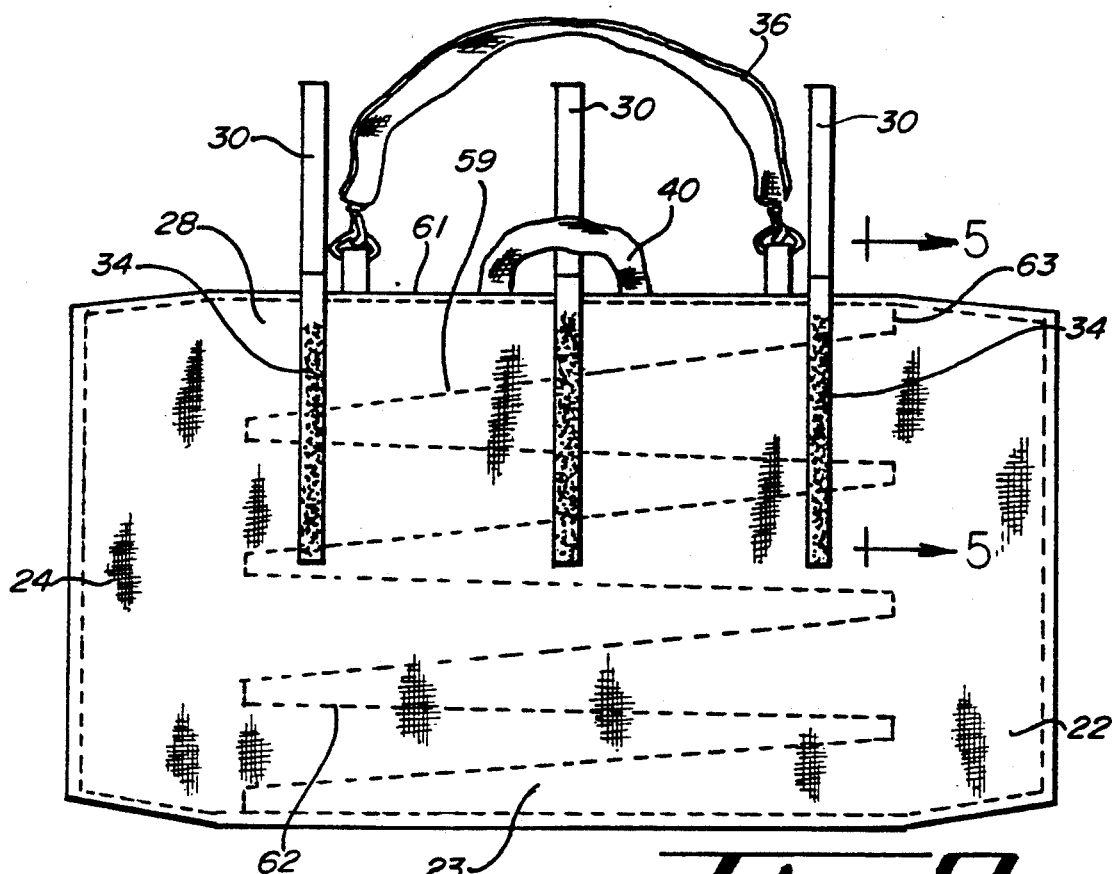
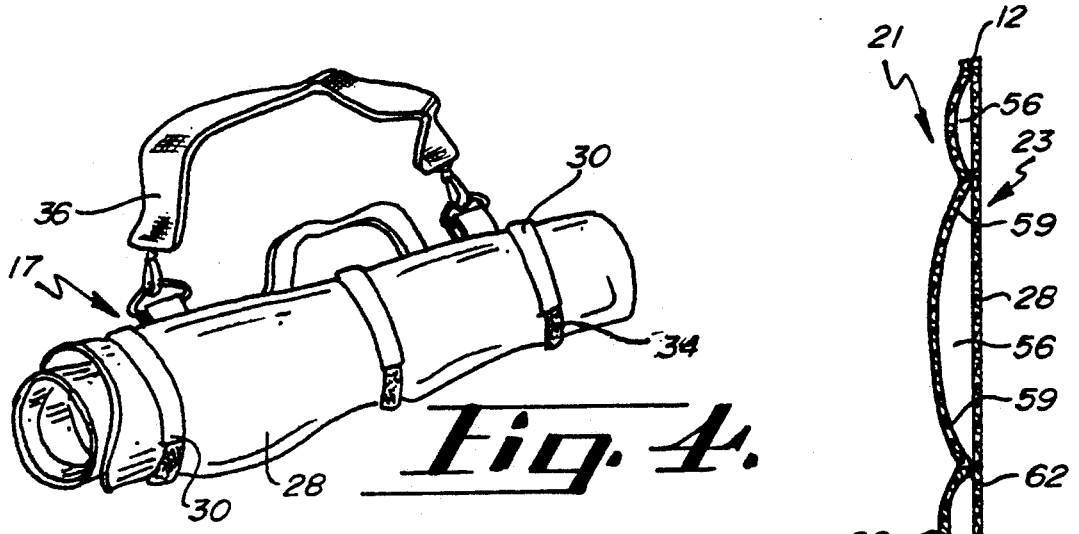

ROD ORGANIZER

BACKGROUND OF THE INVENTION

Transportation and storage of fishing rods and reels typically requires disassembly of the rods from the reels, enclosing the rods in rigid tubes and putting the reels in separate cloth bags or boxes. Typically, the tubes, bags, or boxes only accommodate a single rod or reel.

The time and inconvenience of disassembly often means that the rods and reels are transported or stored without disassembly. This can subject the equipment to entanglement or damage. Also, failure to enclose the equipment in cases can lead to damage from moisture, accumulation of dirt and dust on the equipment, and the fading of coloring or graphics on the equipment.

SUMMARY OF THE INVENTION

A carrying and storage case for fishing rods with attached reels and accessories is disclosed. The case is comprised of a durable fabric or similar flexible material substantially rectangular in shape. The case has a plurality of adjacent elongate pockets which extend from one end of the case to the other end with the openings for each sequential pocket located on alternating ends of the case. The pockets are widest at the opening and narrow towards the opposite end of the pocket. The pocket and openings are sized to permit insertion of a fishing rod with attached reel into the pocket. The case has flaps on each end which fold over the openings of the pockets thereby securing the rods with attached reels within the pockets. The case has a plurality of straps with attachment means extending from the top of the case whereby the case may be rolled up and secured by the straps in the rolled-up position with rods and attached reels in the pockets. The case also has one or more additional closeable pockets attached to the top or bottom of the case. The additional closeable pockets for holding accessories are enclosed within the case when the case is in the rolled-up position. The case has a handle and/or shoulder strap for carrying.

An advantage of the invention is that rods and reels may be inserted in the carrying case without the disassembly of the rod from the reel. This allows the rods and reels to be placed into the case for transportation or storage with a minimal effort and in a minimal amount of time.

An additional feature of the invention is that the case will accommodate multiple rods and reels of various sizes.

Another advantage is that fishing lures and accessories may be stored within the accessory pockets in the same carrying case as the rods and reels.

Another advantage of the invention is that the case eliminates the rattling and the potential damage to rods which is a hazard in transporting multiple rods in a single hard tube.

Another advantage of the invention is that the alternating orientation of the rods and reels in the pockets substantially eliminates tip breakage which can otherwise easily occur during transportation of this equipment. In the rolled-up orientation the reel ends of the rods provide sufficient rigidity and strength to prevent damage to the tip ends of the rods during transportation.

An additional advantage of the invention is that each rod and reel is enclosed in a separate compartment of the case minimizing entanglement of the equipment and providing an effective means of organizing the equipment.

BRIEF DESCRIPTION OF THE DRAWINGS

FIG. 2 shows a plan view of the outside face of the fishing rod and reel case in an unrolled position.

FIG. 4 shows a perspective of the rod and reel case in a rolled-up position.

FIG. 5 shows a sectional view taken along plane 5—5 of FIG. 2.

DETAILED DESCRIPTION OF THE PREFERRED EMBODIMENTS

Figure 1:
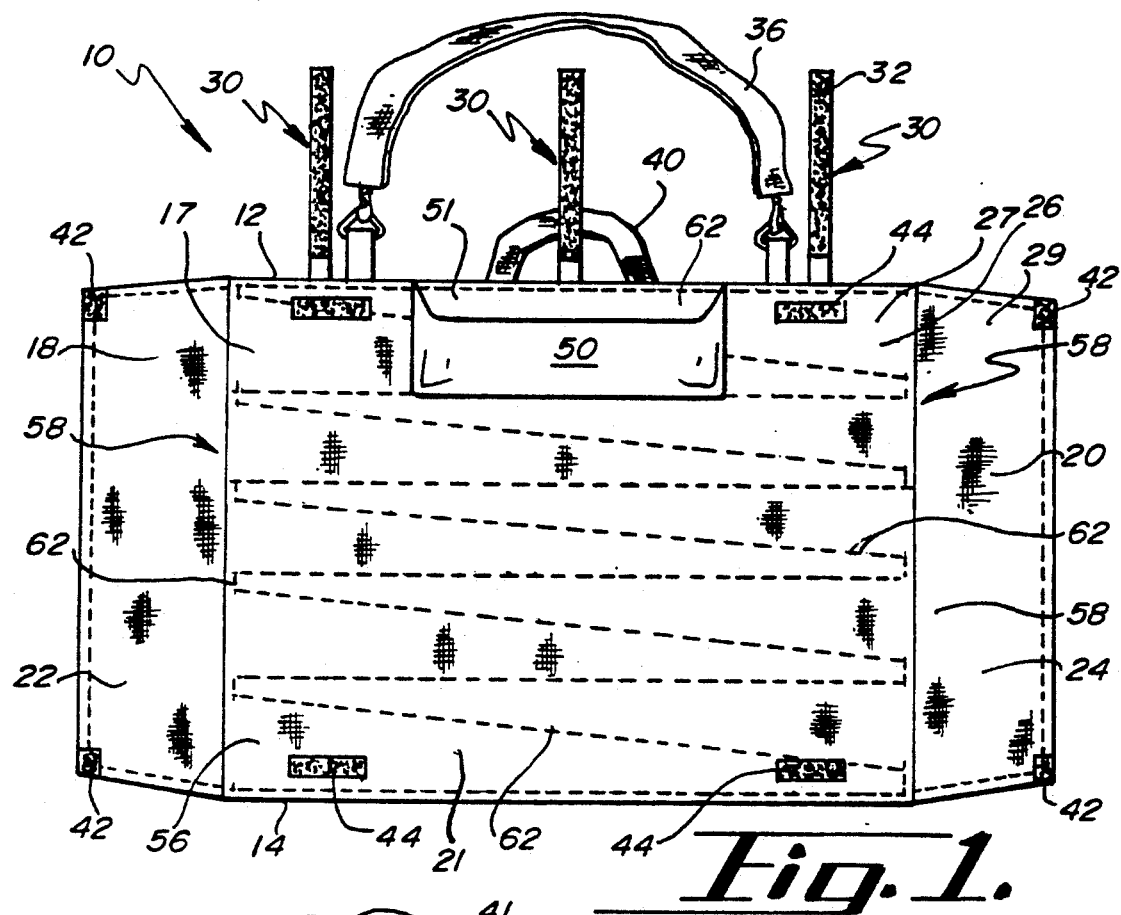
FIG. 1 shows a plan view of the inside face of the fishing rod and reel case in the unrolled position.

FIG. 1 shows the preferred embodiment of the rod and reel case 10. As can be seen, the case 10 is substantially rectangular in configuration when in the unrolled position. The case body 17 is comprised of the inside layer 27 and outside layer 29. The first flap 22 and second flap 24 are integral with the outside layer 29. The stitching 62 is shown traversing the body 17 of the case 10. The stitching 62 forms the pockets 56 with openings 58 on the inside portion 21 of the case in the shape of truncated triangles. The stitching 62 extends from the first end portion 18 to the second end portion 20 attaching the inside layer 27 to the outside layer 29 creating the pockets 56. The pocket openings 58 are seen not to have any stitching on FIG. 1. Extending from the first end portion 18 and the second end portion 20 are the first flap 22 and the second flap 24. Affixed to the corners of the first flap 22 and the second flap 24 are pads 42 of an interlocking hook and loop fabric such as VELCRO®. Complementary VELCRO® pads 44 are located on the inside portion 21 of the case body 17 for securing the first flap 22 and second flap 24 to the inside portion 21 of the case body 17. Alternate embodiments may utilize other releasable fastening means such as snaps, buckles, straps, or strings.

Several binding straps 30, a carrying handle 40, and the shoulder strap 36 are shown extending from the upper or top edge 12. These elements can be attached by way of the stitching 62 with the elements inserted between the inside layer 27 and the outside layer 29. An interlocking hook and loop fabric 32 is attached by stitching or other means to straps 30. Also shown in FIG. 1 is the accessory pocket 50 which is shown attached by way of the stitching 62. The accessory pocket 50 may also be removably attached by way of the complementary hook or loop interlocking fabric. In the preferred embodiment the accessory pocket 50 is of transparent material.

FIG. 2 shows a plan view of the outside portion 28 of the fishing rod and reel case 10. Affixed to the outside face 28 of the outside layer 29 by stitching or other means are the binding straps 30 which are shown with the interlocking hook and loop fabric 34 which complements the hook or loop fabric 32 shown on the ends of the straps 30 in FIG. 1.

Figure 3:
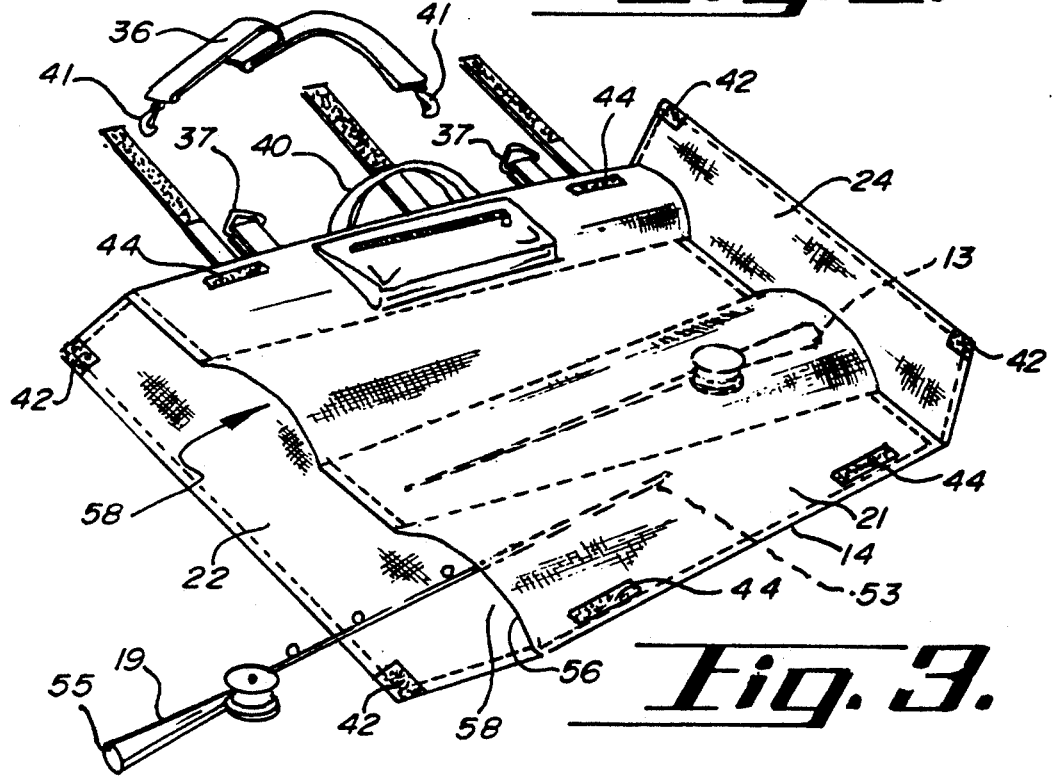
FIG. 3 shows a perspective of the rod and reel case.

FIG. 3, showing the inside portion 21, is a perspective view of the fishing rod and reel case 10 with one fishing pole 13 in place as indicated by the phantom lines. An additional fishing rod and reel 19 is shown partially inserted into the pocket opening 58. As shown, the tip end 24 of the rod 53 is inserted first and the reel end 55 is inserted last. The second flap 24 is shown partially closed over the pocket openings 58. The shoulder strap 36 is shown detached from the body. The detachment is facilitated by the J-hooks 41 and the D-rings 37.

With the rods and reels in place and the first and second flaps 22, 24 secured to the body 17, the case 10 is rolled up commencing with the bottom edge 14. The straps 30 then secure the case 10 in the rolled-up position.

FIG. 4 shows the fishing rod and reel case 10 in a rolled-up configuration with the outside face 28 of the outside layer 29 exposed. The binding straps 30 are shown in their fastened position attached to the interlocking fabric 34. The rods and reels are thus totally enclosed within the case 10 along with any accessories which may be in the accessory pocket 50.

FIG. 5 shows a cross sectional view taken at plane 5—5 of FIG. 2 which shows the sides of the pocket 59, the inside layer 27, and the outside layer 28 joined together by the stitching 62.

The inside layer 27, outside layer 29, and straps 30 may be made of various natural or synthetic materials such as leather, canvas, vinyl, or Cordura TM or combinations of the same. The outside layer 29 may be of a slightly thicker material or combination of material to provide additional shock insulation or absorption characteristics. Padding, not shown, may also be incorporated into the body as desired. The accessory pocket 50 may also be of the same material as the first and second layers 27, 29.

The case can be manufactured of appropriate size to carry shorter rods and reels such as for ice fishing, or longer rods and reels such as for fly fishing. Additionally, it is anticipated that the above configuration the case 10 may be used with the fishing rod and reel only partially broken down, such as with the rod taken apart but the reel remaining on the lower portion of the rod.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A fishing rod and reel case for transporting and storing fishing rods with attached reels, the case comprising:

a substantially rectangular body, the body having an upper edge, an inside portion, an outside portion, a first end portion, and a second end portion; the body comprised of flexible material, whereby the case may be rolled up;

a plurality of sequential pockets located on the inside portion of the body, the pockets in the shape of elongate truncated triangles, each pocket extending from the first edge portion to the second edge portion, each pocket having a pocket opening, the pocket opening and pocket sized to permit insertion of a fishing rod with attached reel;

a first flap attached to the first end portion of the body and a second flap attached to the second end portion of the body, whereby the flaps may be folded to the inside portion of the body thus covering the pocket openings; and an attachment means for securing the case in a rolled-up position.

2. The case of claim 1 further comprising a releasable attachment means for securing the first flap to the body and a releasable attachment means for securing the second flap to the body.

3. The case of claim 1, wherein the plurality of pockets are oriented so that the opening for each sequential pocket alternates between the first end portion and the second end portion.

4. The case of claim 3, wherein the releasable attachment means for securing the case in a rolled-up position comprises at least one strap attached to the body, the strap sized to encircle the case in the rolled-up position, the strap having a releasable fastening means for securing the case in the rolled-up position.

5. The case of claim 4 further comprising a handle attached adjacent to the top edge of the body.

6. The case of claim 5 further comprising a shoulder strap and releasable attachment means for attaching the shoulder strap to the body.

7. The case of claim 6 further comprising padding incorporated in the rectangular body.

8. The case of claim 6 further comprising a closeable accessory pocket attachable to the body.

9. The case of claim 6 further comprising a closeable accessory pocket attached to the body in proximity to the bottom edge.

10. The case of claim 5, wherein the releasable attachment means for securing the first flap to the body and the releasable attachment means for securing the second flap to the body comprises cooperating releasable interlocking fabric pads.

11. The case of claim 4, wherein the releasable fastening means for securing the case in a rolled-up position comprises cooperating releasable interlocking fabric attached to the strap.

12. A case for transporting and storing a plurality of fishing rods with attached reels, the fishing rods each having a reel end and a tip end, the case comprising:

a substantially rectangular body, the body having an upper edge, an inside portion, an outside portion, a first end portion, and an opposite second end portion; the body comprised of flexible material, whereby the case may be rolled up;

a plurality of sequential pockets located on the inside portion of the body, each pocket extending from the first edge portion to the second edge portion, each pocket having an open end, two closed sides, and a closed end, the closed end narrower than the open end, the open end and pocket sized to permit the insertion of a fishing rod with attached reel, the tip end first, the pockets oriented so that the opening for each sequential pocket alternates between one end portion and the opposite end portion;

a first flap attached to the first end portion of the body, the flap oriented and sized so that it may be folded against the inside portion of the body thereby covering the pocket openings at the first end portion;

a second flap attached to the second end portion of the body, the flap oriented and sized so that it may be folded against the inside portion of the body thereby covering the pocket openings at the first end portion;

a releasable attachment means for securing the case in a rolled-up position.

13. The case of claim 12 further comprising a releasable attachment means for securing the first flap to the body and a releasable attachment means for securing the second flap to the body.

14. The case of claim 13, wherein the releasable attachment means for securing the case in a rolled-up position comprises a plurality of straps attachable to the body, the straps sized to encircle the case in the rolled-up position, the straps each having cooperating interlocking fabric for securing the case in the rolled-up position.

15. The case of claim 14 further comprising a handle attached adjacent to the top edge of the body.

16. The case of claim 15 further comprising a shoulder strap and releasable attachment means for attaching the shoulder strap to the body.

17. The case of claim 16 further comprising padding incorporated in the rectangular body.

18. The case of claim 17 further comprising a closeable accessory pocket attachable to the body.

19. The case of claim 17 further comprising a closeable accessory pocket attached to the body in proximity to the bottom edge.

20. A case for transporting and storing a plurality of fishing rods with attached reels, the case comprised of:
- a top edge, a bottom edge, a first end and a second end;
- an inside layer and an outside layer of a flexible material, both layers substantially rectangular in shape and opposing each other, stitching joining the inside layer and the outside layer, the stitching traversing the case a plurality of times between the first end and the second end;
- a plurality of sequential pockets defined by the stitching, the pockets shaped as elongate truncated triangles, each pocket extending between the first end and the second end, each pocket having a pocket opening, the pocket openings for each sequential pocket located on alternate ends of the case;
- a first flap extending from the outside layer of the first end, a second flap extending from the outside layer of the second end;
- cooperating releasable interlocking fabric located on the first flap and on the inside layer, cooperating releasable interlocking fabric located on the second flap and the inside layer, whereby the first flap and second flap may be folded over and secured to the inside layer to cover the pocket openings;
- a plurality of straps attached to the outside layer and extending from the top edge of the case, the straps each having a pair of cooperating interlocking fabric pads whereby each strap can be releasably attached to itself to secure the case in a rolled-up configuration;
- an accessory pocket attached to the inside layer of the case; and
- a carrying strap attachable at the top edge of the case.

* * * * *